United States Patent [19]

Giebeler

[11] 4,406,485

[45] Sep. 27, 1983

[54] TUBULAR CONNECTOR

[75] Inventor: Ben F. Giebeler, San Bernardino, Calif.

[73] Assignee: Arrowhead Continental, San Bernardino, Calif.

[21] Appl. No.: 258,022

[22] Filed: Apr. 27, 1981

[51] Int. Cl.³ .................... F16L 37/00; F16L 55/00; F16L 21/00

[52] U.S. Cl. .................... 285/391; 285/92; 285/401

[58] Field of Search .............. 285/89, 91, 92, 391, 285/401

[56] References Cited

U.S. PATENT DOCUMENTS

| | | |
|---|---|---|
| 1,372,238 | 3/1921 | Kreiter . |
| 1,685,619 | 9/1928 | Welsh . |
| 2,111,859 | 3/1938 | Kennedy . |
| 3,442,536 | 5/1969 | Fowler . |
| 3,922,009 | 11/1975 | Giebeler . |
| 3,948,545 | 4/1976 | Bonds .................... 285/391 X |

Primary Examiner—Richard J. Scanlan, Jr.
Attorney, Agent, or Firm—Lyon & Lyon

[57] ABSTRACT

Tubular telescoping members have interrupted circumferential lugs which engage through relative axial movement followed by relative turning movement of the members. A releasable locking device prevents reverse relative turning movement of the members and comprises a plurality of threaded lock elements engaging internally threaded openings in an outer tubular member near its terminal shoulder. Each lock element is installed from the inside of the outer member, and has a portion accessible exteriorly of the outer member. Each lock element has a circular flange which projects beyond the terminal shoulder and into a detent provided on an external annular shoulder on the inner member. The circular flange is interrupted at one location by a flat face which is flush with the terminal shoulder when the lock element is turned one-half revolution.

6 Claims, 8 Drawing Figures

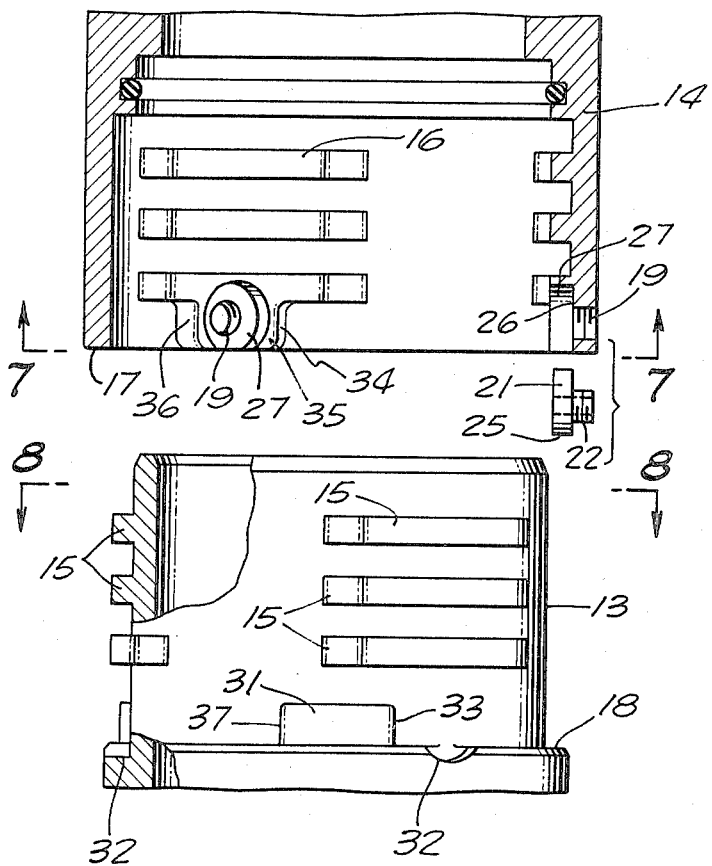
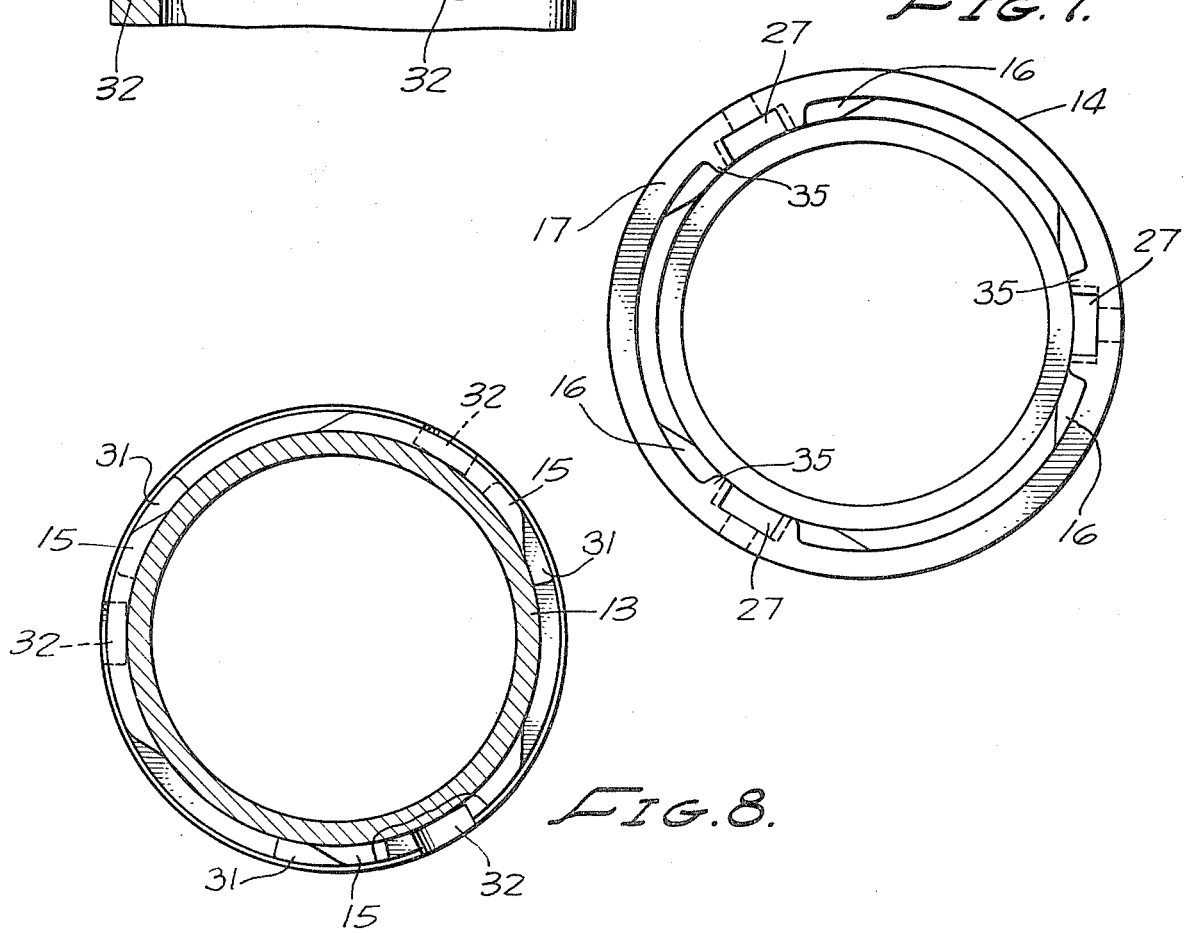

TUBULAR CONNECTOR

This invention relates to tubular connectors useful for carrying fluids at high pressures under conditions of vibration. For example, such connectors may be used in well-cementing operations where high pressure pumps deliver liquid cement in large volumes into a well casing. The pulsing action of the pumps often produces severe vibratory motions in the tubular members leading to the well casing.

It is desirable to have a connector device for the tubular members which is large enough and strong enough to carry a high volume of high pressure fluid under conditions of vibrations, and yet which can be readily connected and disconnected through bayonet joint action. Tubular connectors of this general type commonly employ circumferentially extending interrupted lugs which cooperate to resist axial separation of the members, together with a locking device to prevent unwanted relative turning movement of the members which would permit disengagement of the lugs. The present invention is directed to an improved form of locking device for this purpose.

Other and more detailed objects and advantages will appear hereinafter.

In the drawings:

FIG. 6 is an exploded view partly in section, showing the tubular connector members prior to assembly.

FIG. 7 is a view taken in the direction 7—7 as shown in FIG. 6.

FIG. 8 is a sectional plan view taken substantially on the lines 8—8 as shown in FIG. 6.

Figure 1:
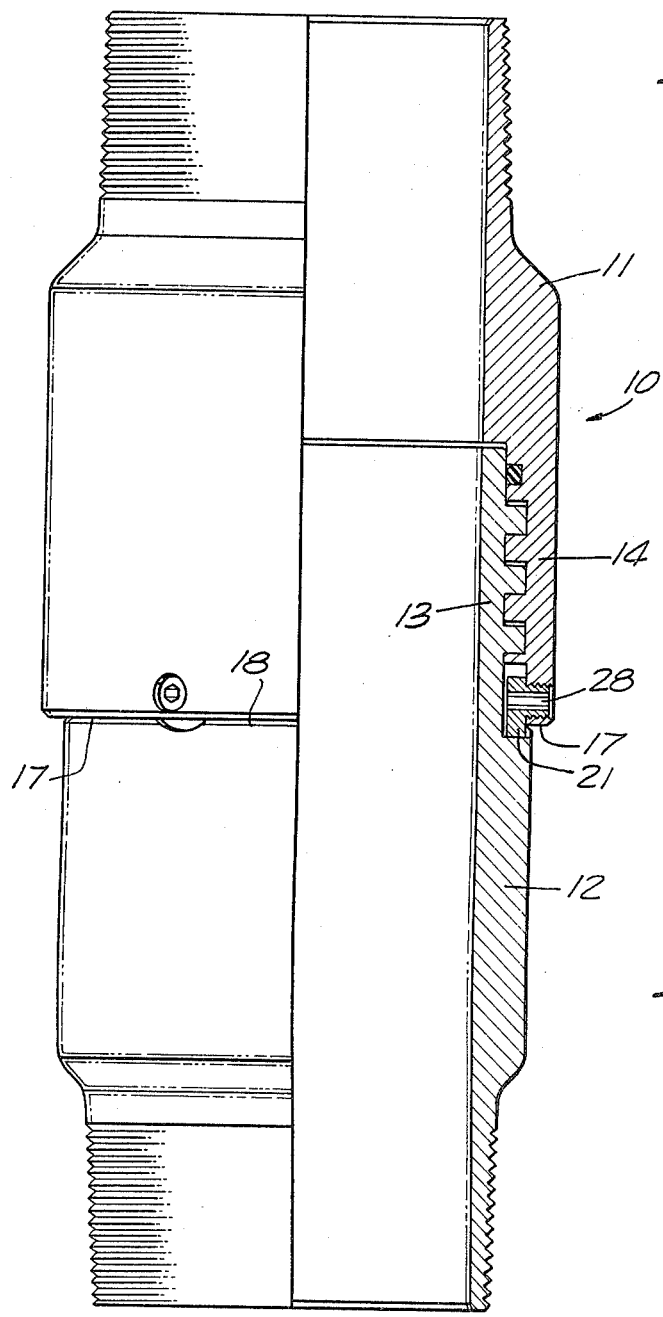
FIG. 1 is a side elevation partly in section, showing a preferred embodiment of this invention.

Referring to the drawings, the tubular connector generally designated 10 includes an outer tubular member 11 and an inner tubular member 12. A portion 13 of the inner tubular member is telescopically received within an encircling portion 14 of the outer tubular member 11.

A series of circumferentially extending interrupted lugs 15 on the portion 13 of the inner tubular member 12 engage a similar series of lugs 16 located within the encircling portion 14 of the outer tubular member 11. These interrupted lugs 15 and 16 extend only part of the way around the circumference, with adequate space to permit relative axial movement of the members 11 and 12 so that the terminal shoulder 17 on the outer member meets the annular external shoulder 18 on the inner member 12. Relative turning movement of the members then brings the lugs 15 and 16 into face-to-face engagement.

In accordance with this invention, means are provided for locking the tubular members 11 and 12 against relative turning movement. As shown in the drawings, this means includes a plurality of radially extending internally threaded openings 19 positioned in the encircling portion 14 of the outer tubular member 11, and located near the terminal shoulder 17. A lock element 21 is provided for each of the openings 19 and each lock element has an externally threaded portion 22 received within the internally threaded opening 19. Each lock element also has a coaxial circular flange 23, a segment 24 thereof being removed so that the circular flange 23 is interrupted by a flat face 25.

Figure 2:
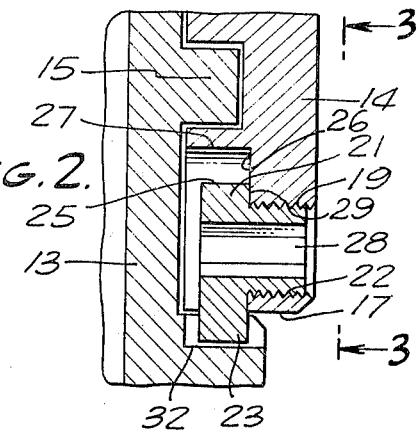
FIG. 2 is an enlarged sectional detail of a portion of FIG. 1.
Figure 3:
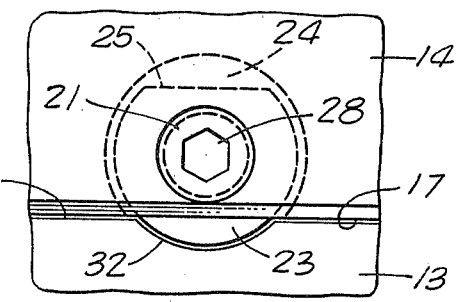
FIG. 3 is a side elevation taken in the direction 3—3 as shown in FIG. 2.
Figure 4:
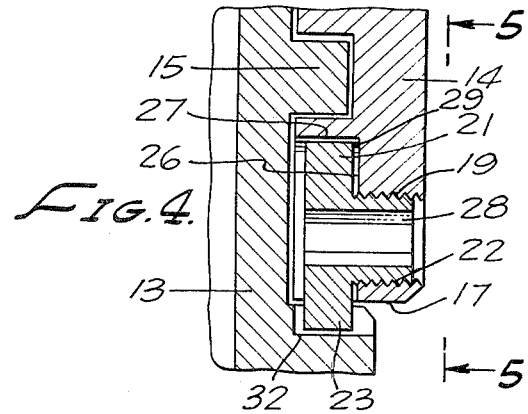
FIG. 4 is a sectional view similar to FIG. 2, showing the lock element in a different position.
Figure 5:
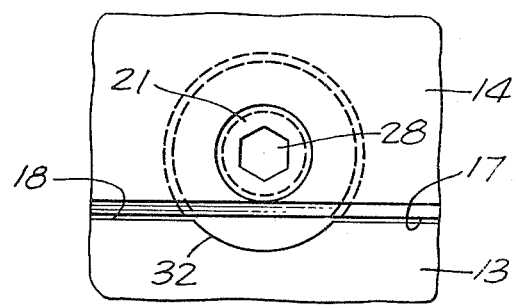
FIG. 5 is a side elevation taken in the direction of lines 5—5 as shown in FIG. 4.

The flat face 25 on each lock element 21 is produced in the following manner: Before assembly of the inner and outer tubular members, the lock elements 21 are each placed in position from the inside of the outer tubular member and turned along the threaded portions 19 and 22 to bring the flanges 23 into contact with the end surface 26 of each recess 27. Each recess 27 is provided in the outer member 11 and it is coaxial with one of the threaded openings 19 as shown in FIG. 4. Turning movement of each lock element 21 within its respective threaded opening 19 is accomplished by means of a suitable tool such as an Allen wrench engaging a central non-circular cavity 28 within each lock element 21. This central cavity 28 is accessible exteriorly of the outer tubular member 11. When the annular surface 29 of the flange 23 engages the end surface 26 of the recess 27, further turning motion of the lock element 21 along the threads is prevented. The lock element 21 is then turned in the reverse direction for one-half revolution. The segment 24 of the flange 23 which projects beyond the terminal shoulder 17 is then cut away as shown in FIG. 2 to leave the flat face 25 which does not project beyond the terminal shoulder 17.

The inner tubular member 12 is then assembled with respect to the outer tubular member 11 by axial movement, the inner portion 13 of the inner member 12 being telescopically received within the encircling portion 14 of the outer tubular member 11, the members being oriented so that the interrupted lugs 16 and 15 clear each other during the telescopic movement. Relative turning movement between the tubular members 11 and 12 then brings the lugs 16 and 15 into face-to-face engagement, such turning movement being limited by contact of the face 33 of the boss 31 with the face 34 of the stop boss 35. The tool, not shown, then is used to engage the non-circular cavity 28 of each lock element to turn it back through one-half revolution, thereby extending the circular portion of the flange 23 into a detent 32 provided in the annular external shoulder 18 of the inner member 12. Relative turning movement of the tubular members 11 and 12 is then prevented.

When it is desired to separate the tubular members 11 and 12, the tool is used to turn the lock elements 21 each through one-half revolution to bring the flat faces 25 into flush position with respect to the terminal shoulder 17. The members 11 and 12 may then be turned until the face 36 of the stop boss 35 contacts the face 37 of the boss 31. This allows the interrupted lugs 15 and 16 to move into clearance position, for subsequent axial separation of the members 11 and 12.

It will be understood that the tubular connector embodying this invention does not require any welding or weldments; it is of integral one-piece construction. This allows for maximum strength from suitable heat treatment without danger of stress-raising joinders between welded parts. The device has the advantage of simplicity and includes a self-contained locking system having parts which are prevented from moving from operative position when the coupling parts are assembled. The fact that the locking system is self contained stems from the fact that the parts thereof are assembled from the inside of the outer member 11, not from the outside.

These locking parts cannot move from operative position after the parts are assembled because the parts cannot be dislodged from the outside of that member.

Having fully described my invention, it is to be understood that I am not to be limited to the details herein set forth but that my invention is of the full scope of the appended claims.

I claim:

1. In a tubular connector, the combination of: an outer tubular member having a terminal shoulder and having a radially extending internally threaded opening adjacent said terminal shoulder, an inner tubular member having a portion telescopically received within said outer tubular member and having an external annular shoulder, said members having means cooperating to resist axial separation of said members, a recess on the inside of said outer tubular member coaxial with said internally threaded opening and having an end surface, a lock element having an externally threaded portion received from the inside of said outer tubular member into said internally threaded radial opening, said lock element having a flange positioned in said recess and adapted to contact said end surface, said flange having a periphery interrupted by a portion which is substantially flush with said annular shoulder when said lock element is turned on said threads for predetermined angular travel to separate said flange from said end surface of said recess, a detent in said external annular shoulder on the inner member receiving another portion of said flange to prevent relative turning movement of said tubular members, and means on said lock element accessible from the outside of said outer tubular member for turning said lock element in said internally threaded opening.

2. In a tubular connector, the combination of: an outer tubular member having a terminal shoulder and having a radially extending internally threaded opening adjacent said terminal shoulder, an inner tubular member having a portion telescopically received within said outer tubular member and having an external annular shoulder, said members having circumferentially extending interrupted lugs cooperating to resist axial separation of said members, a recess on the inside of said outer tubular member coaxial with said internally threaded opening and having an end surface, a lock element having an externally threaded portion received from the inside of said outer tubular member into said internally threaded radial opening, said lock element having a flange positioned in said recess and adapted to contact said end surface, said flange having a periphery interrupted by a portion which is substantially flush with said annular shoulder when said lock element is turned on said threads for predetermined angular travel to separate said flange from said end surface of said recess, a detent in said external annular shoulder on the inner member receiving another portion of said flange to prevent relative turning movement of said tubular members, said lock element having a non-circular cavity accessible from the outside of said outer tubular member for turning said lock element in said internally threaded opening.

3. In a tubular connector, the combination of: an outer tubular member having a terminal shoulder, an inner tubular member having a portion received within said outer tubular member and having an external annular shoulder, the outer tubular member having a radially extending internally threaded opening adjacent its terminal shoulder, said members having interengaging parts cooperating to resist axial separation of said members, a recess on the inside of said outer tubular member coaxial with said internally threaded opening and having an end surface, a lock element having external threads received from the inside of said outer tubular member into said internally threaded radial opening, said lock element having a flange positioned in said recess and adapted to contact said end surface, said flange having a circular periphery interrupted by a flat surface flush with said annular shoulder when said lock element is turned on said threads for predetermined angular travel to separate said flange from the end face of said recess, a detent in said annular shoulder receiving a circular portion of said flange, and means on said lock element accessible from the outside of said outer tubular member for turning said lock element in said internally threaded opening.

4. The combination set forth in claim 3 in which a plurality of lock elements cooperate with the same number of detents.

5. In a tubular connector for an outer tubular member adapted to receive a portion of an inner tubular member in telescopic relationship, the inner member having an annular shoulder, the improvement comprising, in combination: lock means for preventing relative rotation between said members when assembled, said lock means comprising a recess in the inner wall of the outer member and provided with an end surface, an opening extending radially through said outer member and intersecting said end surface, a lock element insertable into said recess from the inside of said tubular member prior to telescopic assembly of said members, said lock element having a flange adapted for contact with said end surface, said lock element having a portion extending into said radial opening, said flange having a periphery interrupted by a portion which is substantially flush with the annular shoulder in one position of the lock element, to permit relative turning movement between said members, a detent in the annular shoulder receiving another portion of said flange to prevent relative turning movement of said members, and means on said lock element accessible from the outside of said outer tubular member for turning said lock element in said radial opening.

6. In a tubular connector for an outer tubular member adapted to receive a portion of an inner tubular member in telescopic relationship, the outer tubular member having a downward facing terminal shoulder at its lower end, the inner tubular member having an adjacent upward facing annular shoulder, the improvement comprising, in combination: lock means for preventing relative rotation between said members when assembled, said lock means comprising a recess in the inner wall of the outer member above the downward facing terminal shoulder and provided with an end surface, an opening extending radially through said outer member and intersecting said end surface, a lock element insertable into said recess from the inside of said tubular member prior to telescopic assembly of said members, said lock element having a flange adapted for contact with said end surface, said lock element having a portion extending into said radial opening and accessible from the exterior of said outer member, said flange having a periphery interrupted by a portion which is substantially flush with said annular shoulder in one position of the lock element, to permit relative turning movement between said members, a detent in said annular shoulder receiving another portion of said flange to prevent relative turning movement of said members, and means on said lock element accessible from the outside of said outer tubular member for turning said lock element in said radial opening.

* * * * *